(12) United States Patent  
Kumar et al.

(10) Patent No.: US 11,068,640 B2  
(45) Date of Patent: Jul. 20, 2021

(54) POWER SHARED CELL ARCHITECTURE

(71) Applicant: Intel Corporation, Santa Clara, CA (US)

(72) Inventors: Ranjith Kumar, Beaverton, OR (US); Mark T. Bohr, Aloha, OR (US); Ruth A. Brain, Portland, OR (US); Marni Nabors, Portland, OR (US); Tai-Hsuan Wu, Portland, OR (US); Sourav Chakravarty, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/649,588

(22) PCT Filed: Dec. 28, 2017

(86) PCT No.: PCT/US2017/068820  
§ 371 (c)(1),  
(2) Date: Mar. 20, 2020

(87) PCT Pub. No.: WO2019/132944  
PCT Pub. Date: Jul. 4, 2019

(65) Prior Publication Data  
US 2020/0279069 A1    Sep. 3, 2020

(51) Int. Cl.  
*G06F 30/3953* (2020.01)  
*G06F 113/18* (2020.01)  
*G06F 115/08* (2020.01)  
*H01L 23/50* (2006.01)  
*H01L 23/522* (2006.01)

(52) U.S. Cl.  
CPC .......... *G06F 30/3953* (2020.01); *H01L 23/50* (2013.01); *H01L 23/5226* (2013.01); *G06F 2113/18* (2020.01); *G06F 2115/08* (2020.01)

(58) Field of Classification Search  
USPC ....................................................... 716/127  
See application file for complete search history.

(56) References Cited

U.S. PATENT DOCUMENTS

| | | | |
|---|---|---|---|
| 9,887,127 B1 * | 2/2018 | Licausi | ............ H01L 21/76816 |
| 2002/0013931 A1 | 1/2002 | Cano et al. | |
| 2006/0019488 A1 | 1/2006 | Liaw | |
| 2013/0069236 A1 | 3/2013 | Chen et al. | |
| 2013/0154128 A1 | 6/2013 | Wang et al. | |

(Continued)

OTHER PUBLICATIONS

International Search Report and Written Opinion for International Patent Application No. PCT/US2017/068820 dated Sep. 28, 2018, 10 pgs.

(Continued)

*Primary Examiner* — Bryce M Aisaka  
(74) *Attorney, Agent, or Firm* — Schwabe, Williamson & Wyatt, P.C.

(57) ABSTRACT

An integrated circuit structure includes a metal level comprising a plurality of interconnect lines along a first direction. A cell is on the metal level, wherein one or more of the plurality of interconnect lines that extend through the cell comprise a power shared track that is segmented inside the cell into one or more power segments and one or more signal segments so that both power and signals share a same track.

25 Claims, 8 Drawing Sheets (56) References Cited

U.S. PATENT DOCUMENTS

2013/0179848 A1* 7/2013 Liu .................. G06F 30/392
716/55
2013/0182484 A1 7/2013 Chong et al.

OTHER PUBLICATIONS

International Preliminary Report on Patentability for International Patent Application No. PCT/US2017/068820 dated Jul. 9, 2020, 7 pgs.

* cited by examiner

Ver. 1

FIG. 4A

Ver. 2

POWER SHARED CELL ARCHITECTURE

CROSS-REFERENCE TO RELATED APPLICATION

This patent application is a U.S. National Phase Application under 35 U.S.C. § 371 of International Application No. PCT/US2017/068820, filed Dec. 28, 2017, entitled "POWER SHARED CELL ARCHITECTURE," which designates the United States of America, the entire disclosure of which is hereby incorporated by reference in its entirety and for all purposes.

TECHNICAL FIELD

Embodiments of the disclosure are in the field of integrated circuit structures and, in particular, a power shared cell architecture.

BACKGROUND

For the past several decades, the scaling of features in integrated circuits has been a driving force behind an ever-growing semiconductor industry. Scaling to smaller and smaller features enables increased densities of functional units on the limited real estate of semiconductor chips. For example, shrinking transistor size allows for the incorporation of an increased number of memory or logic devices on a chip, lending to the fabrication of products with increased capacity. The drive for ever-more capacity, however, is not without issue. The necessity to optimize the performance of each device becomes increasingly significant. Scaling multi-gate transistors has not been without consequence, however. As the dimensions of these fundamental building blocks of microelectronic circuitry are reduced and as the sheer number of fundamental building blocks fabricated in a given region is increased, the constraints on the semiconductor processes used to fabricate these building blocks have become overwhelming.

Variability in conventional and state-of-the-art fabrication processes may limit the possibility to further extend them into the, e.g. 10 nm or sub-10 nm range. Consequently, fabrication of the functional components needed for future technology nodes may require the introduction of new methodologies or the integration of new technologies in current fabrication processes or in place of current fabrication processes. New layouts may be introduced either to accommodate or to enable such future technology nodes.

DESCRIPTION OF THE EMBODIMENTS

A power-signal shared track cell architecture is described for improved cell performance and ease of fabrication that avoids complex patterning needs. In the following description, numerous specific details are set forth, such as specific material and tooling regimes, in order to provide a thorough understanding of embodiments of the present disclosure. It will be apparent to one skilled in the art that embodiments of the present disclosure may be practiced without these specific details. In other instances, well-known features, such as single or dual damascene processing, are not described in detail in order to not unnecessarily obscure embodiments of the present disclosure. Furthermore, it is to be understood that the various embodiments shown in the Figures are illustrative representations and are not necessarily drawn to scale. In some cases, various operations will be described as multiple discrete operations, in turn, in a manner that is most helpful in understanding the present disclosure, however, the order of description should not be construed to imply that these operations are necessarily order dependent. In particular, these operations need not be performed in the order of presentation.

Certain terminology may also be used in the following description for the purpose of reference only, and thus are not intended to be limiting. For example, terms such as "upper", "lower", "above", "below," "bottom," and "top" refer to directions in the drawings to which reference is made. Terms such as "front", "back", "rear", and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

Embodiments described herein may be directed to front-end-of-line (FEOL) semiconductor processing and structures. FEOL is the first portion of integrated circuit (IC) fabrication where the individual devices (e.g., transistors, capacitors, resistors, etc.) are patterned in the semiconductor substrate or layer. FEOL generally covers everything up to (but not including) the deposition of metal interconnect layers. Following the last FEOL operation, the result is typically a wafer with isolated transistors (e.g., without any wires).

Embodiments described below may be applicable to FEOL processing and structures, BEOL processing and structures, or both FEOL and BEOL processing and structures. In particular, although an exemplary processing scheme may be illustrated using a FEOL processing scenario, such approaches may also be applicable to BEOL processing. Likewise, although an exemplary processing scheme may be illustrated using a BEOL processing scenario, such approaches may also be applicable to FEOL processing.

One or more embodiments described herein are directed to a power shared track architecture for cells of an integrated circuit in which library cell designs require that a power track extending through the cell is segmented into a power segment and a signal segment inside the cell such that the power track is used as a shared track for both power and signals. Embodiments may be directed to 10 nanometer or smaller technology nodes. Embodiments may include or be directed to cell layouts that make possible higher performance cells in a same or smaller footprint relative to a previous technology node.

A standard cell is a logic module that implements a simple function and has a predesigned internal layout. A cell library is provided that defines cells available for use in physical implementations using a particular technology node and specifies characteristics of those cells. The cell library typically includes standard cell layouts of different sizes.

In integrated circuit designs, standard cells are placed over a substrate as building blocks for a circuit being implemented on various layers or levels such as, for example, metal 0 (M0), metal 1 (M1), metal 2 (M2), metal 3 (M3), and so on. In one embodiment, cells are described herein that exist primarily on M0 as an example. However, in other embodiments, the cells may exist on any of the metal levels.

The automatic placement and routing of cells to form blocks is an important aspect of modern very large-scale integration (VLSI) devices. During placement, a placement tool accesses the cell layouts from a cell library and places the cells in rows. A router tool then creates connections between the cells at a block level by routing in available metal layers. A collection of cells may form a block. Typically, blocks are designed to use as few routing layers as possible so that higher level routing can be performed over the top of the block for inter-block routing. For example, Poly/M0/M1 comprises cell levels, while upper levels, e.g., M2-M6, are for inter-block routing. The block-to-inter-block boundary can change for each foundry/technology.

Figure 1A:
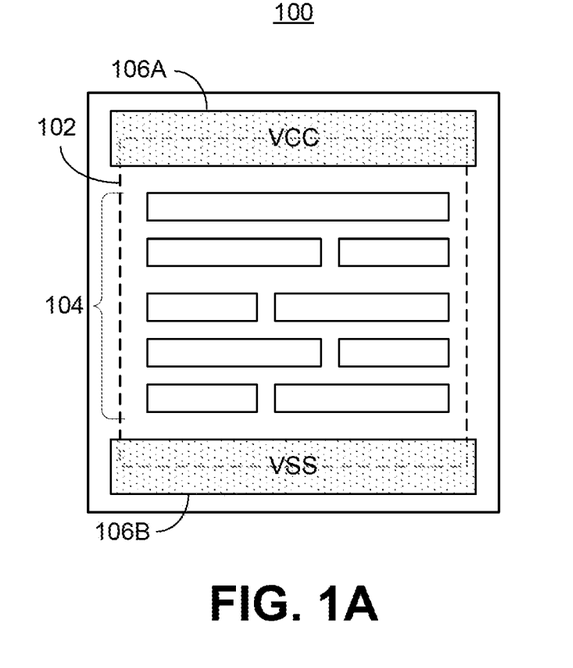
FIGS. 1A-1B are views illustrating a physical implementation of example cell layouts.
Figure 1B:
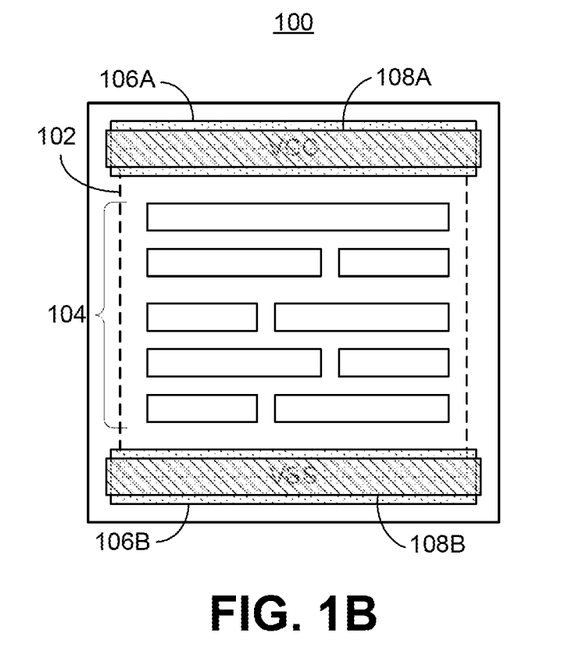

For context, FIGS. 1A-1B are views illustrating a physical implementation of example cell layouts. FIG. 1A illustrates a M0 level structure for cell 100, while FIG. 1B illustrates a M2 level structure for the cell 100. Cell 100 is defined by a cell boundary 102 and comprises a plurality of substantially parallel interconnect lines 104 along a first direction that may be used as signal tracks, input pins and/or output pins. FIG. 1A shows that on the M0 level, the cell 100 includes a set of dedicated power tracks 106A and 106B along the top and bottom boundaries of the cell 100 for VCC and VSS, respectively. Typically, the power tracks 106A and 106B are shared between adjacent cells to obtain the best usage for signal tracks 104. FIG. 1B shows that two levels up on the M2 level, the cell 100 includes another set of dedicated power tracks 108A and 108B between adjacent cells over the first set of power tracks 106A and 106B on the M0 level.

As the dimensions of cells and transistors are reduced, shorter cell heights are being seriously considered for future technology nodes. This is in contrast to previous technology nodes where the cell heights are taller and with taller cell heights there is room to add more metal tracks inside the cell. As technology scales, however, cell heights shrink along with metal pitch. To accommodate a similar number of tracks as in an older technology node, the metal pitches also have to shrink considerably. This pitch shrink and narrow wires increase the RC of the wires, which works against achieving higher cell performance. Consequently, dedicating entire tracks to power becomes a luxury as it requires tighter metal pitches.

The power tracks of the cell 100 are typically connected to other metal layers using vias (vertical interconnect access). As used herein, a via is a small opening through one or more adjacent levels to provide a conductive connection. Vias may be located on a via level between metal levels, e.g., a via 1 level between M0 and M1 to connect interconnect lines on M0 to interconnect lines on M1. Assuming metal pitches are tightened and tracks are dedicated to power with reduced poly pitches, the result would create aggressive via design rules that lead to other problems. For example, for adjacent cells, design restrictions would be required to handle tight end-to-end (ETE) cell connections to accommodate the vias on the power tracks that are necessary to connect to external power.

Accordingly, one or more embodiments described herein are directed to a concept of "power shared tracks" to enable the need for a lesser number of tracks as technology shrinks. The present embodiments dispense for the need of basic cells to have dedicated power tracks 106 on the first metal level connecting to the cell (e.g., M0), and instead provide library cells that have power shared tracks specifying that in each instance of a cell, the power tracks extending through the cell are segmented into one or more power segments and one or more signal segments within the cell so that the power tracks are used for both power and signals. Outside the cell, each power track is formed from a continuous interconnect line, but is transformed inside the cell into a plurality of non-continuous power and signal segments that share the same track, thus reducing the number of tracks needed inside the cell and enabling higher cell density without the need for tighter pitches.

Figure 2A:
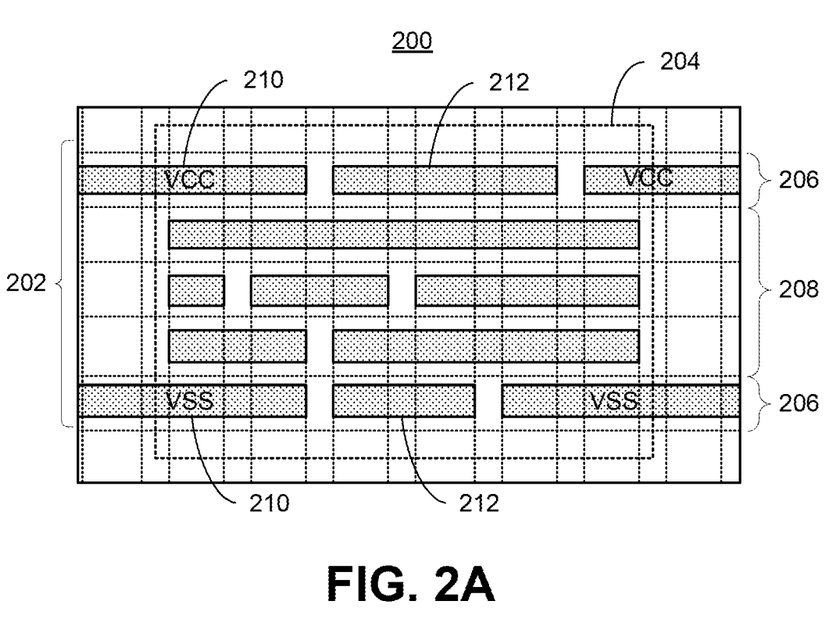
FIGS. 2A-2C are level plan views of physical implementations of an example cell having a shared power track in accordance with an embodiment of the present disclosure.

FIG. 2A is a level plan view of a physical implementation of an example cell having a shared power track in accordance with an embodiment of the present disclosure. The example shows a structure of a layout for cell 200 on the first metal level having interconnect line connections to the cell 200. In one embodiment, the first metal level comprises M0, although in other embodiments another metal level may be the first with connections to the cell. The M0 level includes a plurality of interconnect lines 202, which are substantially parallel and run along a first direction (horizontal in this example).

The cell 200 is on the at least the same metal level as the interconnect lines 202 and is defined by a cell boundary 204. Inside the cell 200, a predetermined number of adjacent interconnect lines 202 may be used as signal tracks 208 (some of which may include input pins and/or output pins). According to one embodiment, instead of dedicated power tracks formed from continuous interconnect lines along outside boundaries of the cell, one or more of the interconnect lines 202 extending through the cell 200 forms power shared tracks 206 that are segmented inside the cell 200 into one or more power segments 210 and one or more signal segments 212 so that both power and signals share the same track. In the embodiment shown, the cell 200 includes one non-continuous shared power track 206 inside one cell boundary (top) for VCC and signals, and another non-continuous shared power track 206 along an opposite cell boundary (bottom) for VSS and signals. As used herein, any interconnect line 202 forming a standard continuous power track outside the cell boundary 204, but is segmented inside the cell to create a power segment 210 and a signal segment 212 defines a power shared track 206.

Figure 2B:
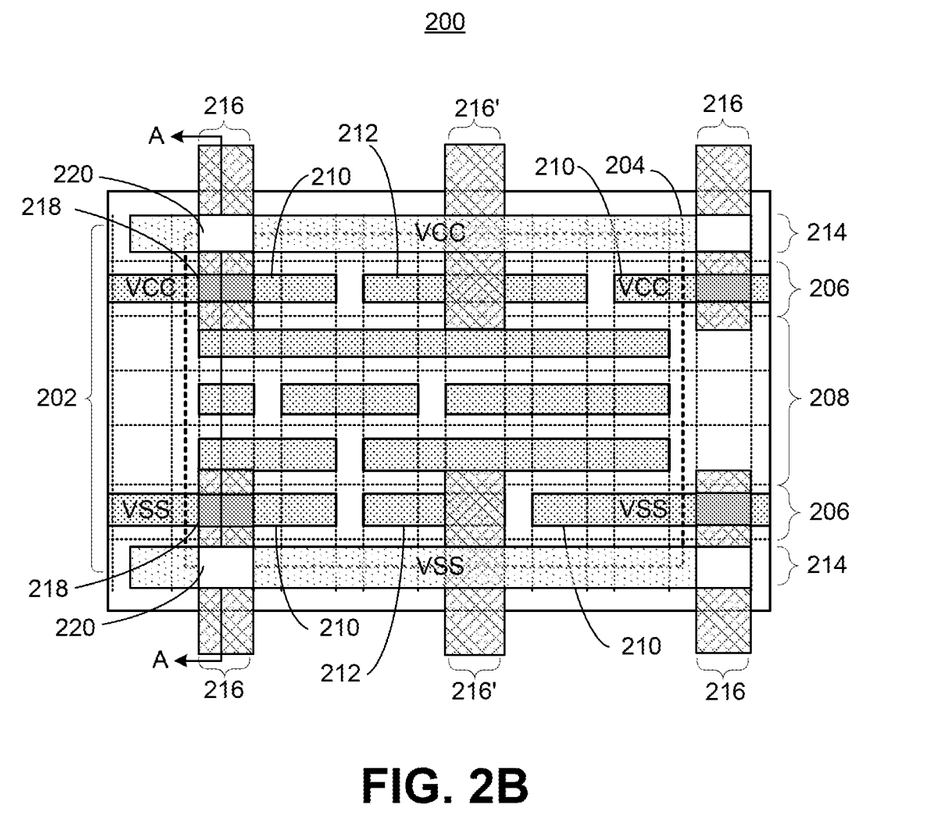

FIG. 2B is a M0, M1, and M2 level plan view of a physical implementation of the example cell 200 having a shared power track. The M1 level lies between the M0 shown in FIG. 2A and the M2 level. The M1 level includes a plurality of interconnect lines running in a vertical direction in this example, which is orthogonal (e.g., within +−5 degrees) to the interconnect lines 202 on M0. In one embodiment, a first plurality of interconnect lines on M1 comprise a plurality of power interconnect lines 216 that each span across and overlay one of the power segments 210 on M0 of the power shared tracks 206 and extend past the cell boundary 204 to external power. A second plurality of interconnect lines on the M1 level comprises power interconnect lines 216' that span across and overlay the signal segments 212 of the power shared tracks 206 and extend past the cell boundary 204 to another adjacent cell.

The M2 level overlays the M1 level and includes at least two power interconnect lines 214 that are substantially parallel and run along the same direction (e.g., horizontal) as the interconnect lines 202 on M0. In one embodiment, the two power interconnect lines 214 comprise a pair of dedicated power tracks 214, one for VCC and other for VSS, which straddle opposite boundaries of the cell 200 and extend through the cell 200.

One purpose of the power interconnect lines 216 on M1 is to connect the lower level power segments 210 on M0 to the dedicated power tracks 214 on M2. This is accomplished through the use of two sets of vias. One set of vias include a respective via 218 (shown as grey squares) on each of the power interconnect lines 216 to connect to power segments 210 on M0. A second set of vias include a respective via 220 on each of the dedicated power tracks 214 to connect to the underlying power interconnect lines 216 exiting the cell 200. Note, that the signal segments 212 do not need to be connected to the dedicated power tracks 214 on M2, and therefore, the power interconnect lines 216' over the signal segments 212 do not include M0/M1 vias.

Figure 2C:
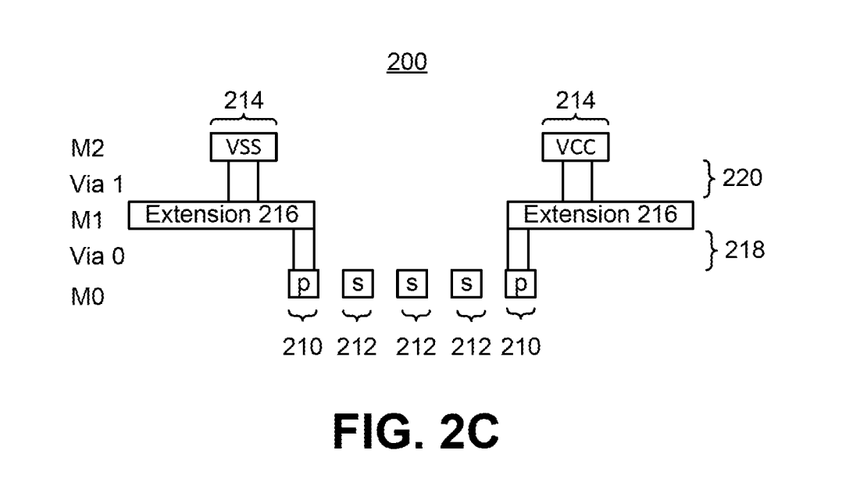

FIG. 2C is a cross-sectional view of the cell 200 in FIG. 2B along line A showing the power connections between M0, M1 and M2. The power segments 210 on M0 are connected to the power interconnect lines 216 on M1 through vias 218, which are located on a via 0 level between M0 and M1. Dedicated power tracks 214 on M2 are connected to the power interconnect lines 216 on M1 through vias 220, which are located on a via 1 level between M1 and M2.

Note, that if another cell along a top or bottom sides of the cell 200 has opposing power interconnect lines 216 216' protruding from the cell boundary 204, the two sets of power interconnect lines 216 216' from the two cells would contact one another. The result is referred to as block level abutment in which the power interconnect lines 216 from adjacent cells touch and short. This means that one cell should not have an opposing protruding power interconnect lines in the same location as an immediately adjacent cell to prevent shorts.

According to a second aspect of the disclosed embodiments, the power shared cells are designed with multiple versions that vary the location of the power interconnect lines 216 on M1 so that during cell placement, the different versions of the cell may be selected and placed in a manner that avoids block level abutment between interconnect lines 216 of adjacently placed cells, described further below.

In terms of an electronic design automation (EDA) flow, a method of fabricating a layout for an integrated circuit structure having power shared tracks 206 and variably located power interconnect lines 216 of the disclosed embodiments may be implemented as follows. The process may begin by designing multiple types of power shared cells to be included in a standard cell library, wherein the power shared cells have a power shared track on a first metal level (e.g., M0) that is segmented inside the cell into one or more power segments and one or more signal segments so that both power and signals share a same track.

A plurality of different versions are designed for each type of power shared cells so that individual versions of each type of cell vary the location of the power interconnect lines on a second metal level (e.g., M1) that extend past a cell boundary. The standard cell library is then accessed by a router during placement and routing functions to select and place physical implementations of the different versions of the cells in a manner that avoids block level abutment between the power interconnect lines of adjacently placed cells. Block level routing is then performed on the physical implementation of the cells.

Figure 3:
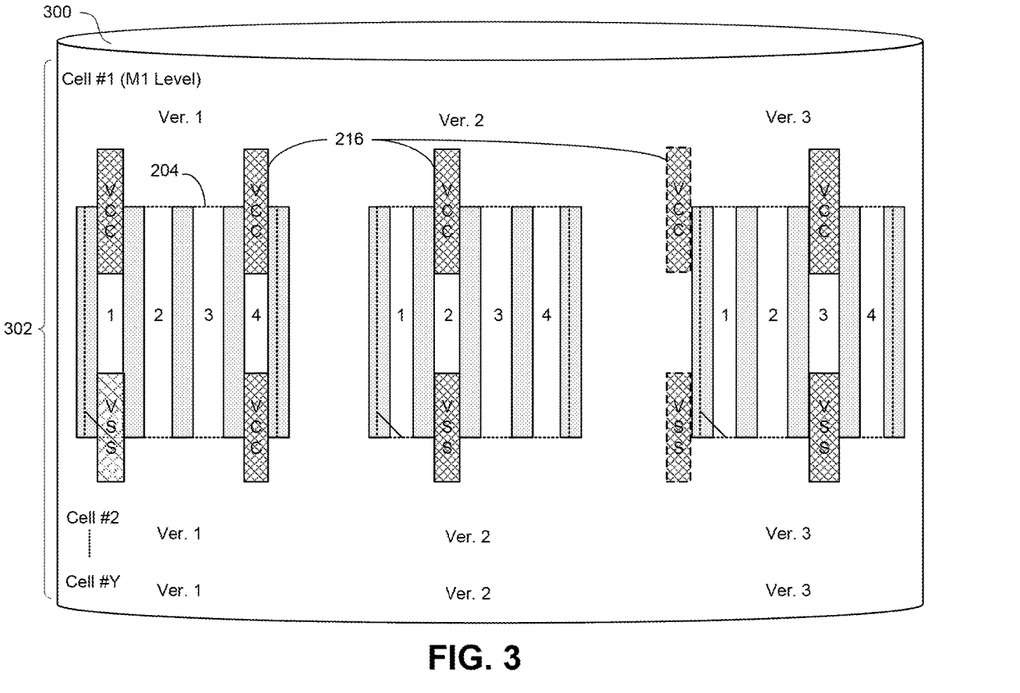
FIG. 3 is a diagram illustrating a standard cell library comprising example entries developed to implement the powered shared track cells.

FIG. 3 is a diagram illustrating a standard cell library 300 comprising example entries 302 developed to implement the powered shared track cells. The standard cell library 300 may be stored in any tangible medium, such as computer memory. The cells included in the standard cell library 300 typically comprise a relatively small number of transistors that define low-level logic functions such as NAND, AND, NOR, OR, flip-flops, laches and buffers. Entries in the standard cell library 300 for the cells may include, but are not limited to, cell layout configuration data, functional definitions, and delay information.

In one embodiment, the standard cell library 300 includes a plurality of entries 302 that define multiple types of power shared cells available for use in physical implementations, where a power shared cell has a power shared track on M0 that is segmented inside the cell into one or more power segments and one or more signal segments. The multiple types of power shared cells are labeled cell #1, cell #2 . . . , cell #Y. In one embodiment, all the cells in the cell library 300 may comprise power shared cells, while in another embodiment, only a portion of the cells in the cell library comprise power shared cells.

According to a second aspect of the disclosed embodiments, the power shared cells are designed with multiple versions that vary the location of the power interconnect lines 216 on M1 so that during cell placement, the different cell versions may be selected and placed in a manner that avoids block level abutment between interconnect lines 216 of adjacently placed cells. In one embodiment, multiple versions are designed for each type of power shared cell. In the example shown, three versions are designed of each type of power shared cell. The three versions are labeled Ver. 1, Ver. 2, and Ver. 3.

FIG. 3 also illustrates that the entries 302 for the cells #1 through cell #Y further include M1 level cell configuration layouts corresponding to the three versions. Only the versions of the configuration layouts for cell #1 are shown. Other cell configuration layouts may be included for other metal levels of the cells. The dotted line represents the cell boundary 204, and the slanted line in the lower-left side of the versions indicates the cell origin. The cell versions are designed to be implemented on a poly-grid of alternating parallel poly lines and metal (i.e., M1) tracks during cell placement. The poly lines separate the M1 tracks on which interconnect lines of power tracks are laid. The cell versions are designed to require a predefined number of M1 tracks to complete the internal routing of the cell. In one embodiment, the predefined number of required M1 tracks is the same across the multiple versions of a particular cell. In FIG. 3, for example, cell #1 is designed to require four metal tracks (labeled 1, 2, 3, 4) in each of the three versions.

According to one aspect of the disclosed embodiments, each version of the cell varies the location of the power interconnect lines 216 that can be laid on any of the four metal tracks based on the following design requirements. At the block level, starting at the origin of Ver. 1 of the cell, one out of every n of the predefined number of M1 tracks comprising the cell in each of the multiple versions of are designated for use as a M1 power track on which one or more one power interconnect line 216 is laid. For example, if n=3, then one out of every three M1 tracks is designated for use as a M1 power track. Across versions of the cell, the location of the M1 power track (and therefore the power interconnect lines 216) is varied in a step-wise movement across x tracks. For example, if x=1, then the location of the M1 power track is moved by one M1 track in the cell away from the origin in relation to an adjacent version of the corresponding cell. In addition, the step-wise movement of the power track location may result in a power track location wrapping around to a track outside the cell boundary adjacent to the cell origin in at least one of the versions of the corresponding power shared cell, as explained below.

Following the design requirements above, in the configuration layout for Ver. 1 of cell #1, the first M1 track inside the cell adjacent to the origin is designated as a power track on which one or more one power interconnect line 216 is laid. The third track from track 1 is track 4, thus track 4 is also designated as a power track for a power interconnect line 216. In one embodiment, at least one power interconnect line 216 is laid per designated power track. In another embodiment, for at least one of the designated power tracks, a pair of power interconnect lines 216 is laid; one power interconnect line 216 for VCC is shown extending past one side (top) of the cell boundary 204, and the second power interconnect line 216 for VSS is shown extending past the opposite side (bottom) of the cell boundary 204.

In the configuration layout for Ver. 2 of cell #1, the location of the power track is moved by one M1 track inside the cell away from the origin with respect to Ver. 1, thus track 2 is designated as the power track on which the power interconnect lines 216 is laid. The third track from track 2 would be track 5 that lies one track outside the cell boundary.

In the configuration layout for Ver. 3 of cell #1, the location of the power track is moved by one M1 track inside the cell away from the origin with respect to Ver. 2, thus track 3 is designated as a power track on which a pair of power interconnect lines 216 is laid. The third track from track 3 would be track 6 that lies two tracks outside the cell boundary 204. However, when a potential power track lies two tracks outside the cell boundary 204, the designation of a power track wraps around to the first M1 track located outside the cell boundary 204 adjacent to the cell origin, as shown, thus maintaining the designation of one out of every three M1 tracks following the designation of track 3.

Figure 4A:
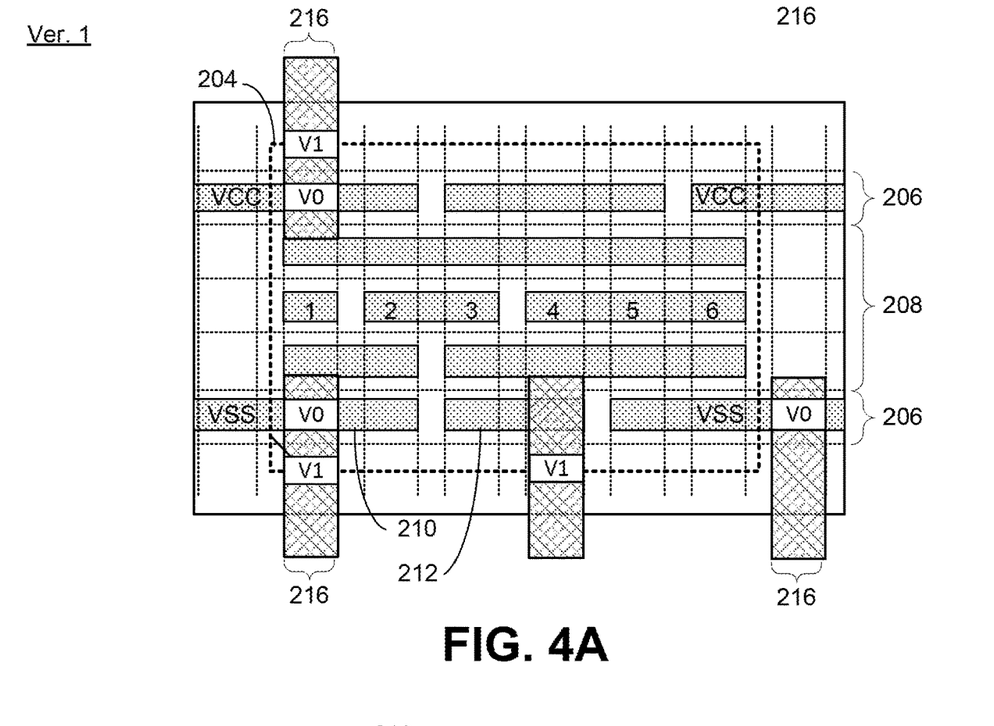
FIGS. 4A-4C also show that in a further embodiment, the versions of the power shared cells in the library include locations of via connections.
Figure 4B:
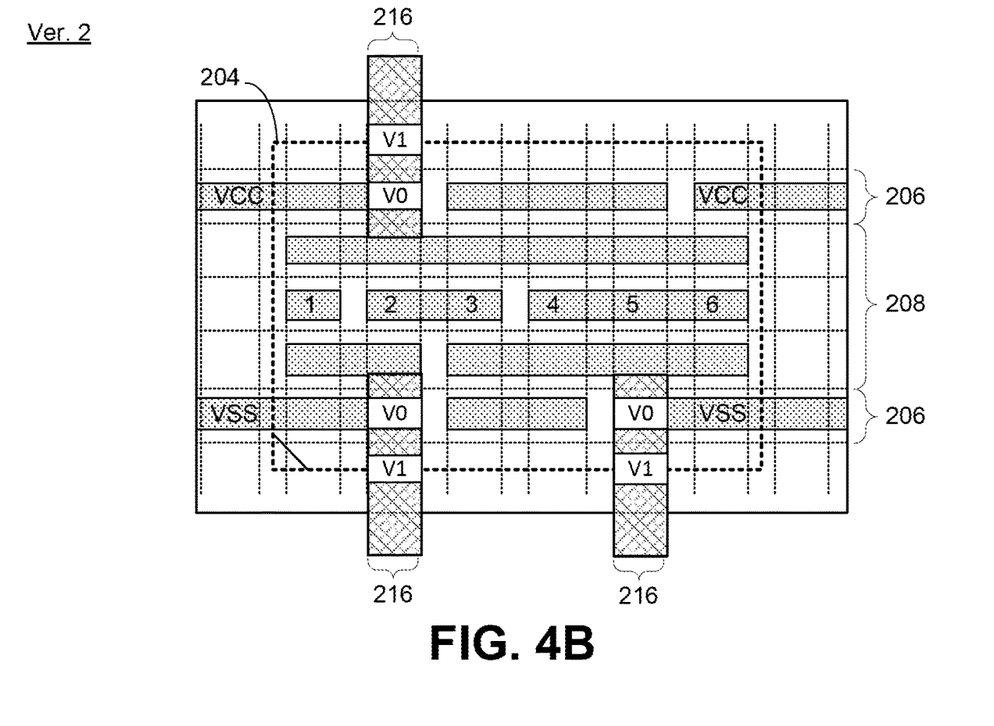
Figure 4C:
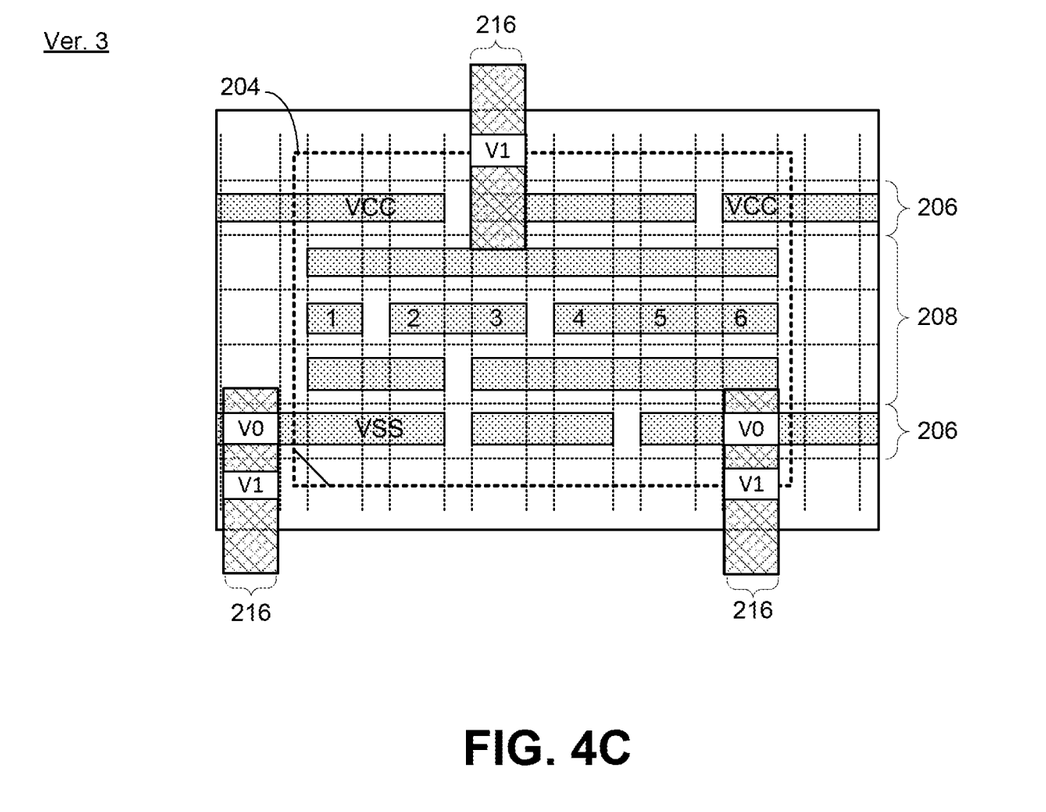

FIGS. 4A-4C are diagrams illustrating plan views of multiple versions of a second type power shared cell. In this example, the power shared cell comprises six metal tracks in each of the three versions, and both M0 and M1 levels are shown. As in the previous example, one out of every three M1 tracks is designated for use as a M1 power track on which one or more one power interconnect line 216 is laid. And across versions of the cell, the location of the M1 power track (and therefore the power interconnect lines 216) is moved by one M1 track in the cell away from the origin in relation to an adjacent version of the corresponding cell.

FIGS. 4A-4C also show that in a further embodiment, the versions of the power shared cells in the library include locations of via connections. V0 represent the vias on the power interconnect lines 216 on M1 to connect to the power segments 210 on the M0. V1 represents the vias on the power tracks (not shown) on M2 to the power interconnect lines 216 on M1.

FIG. 4A shows that in Ver. 1 of the cell, the location of the first power track closest to the origin is track 1 and a power track is located every third track. Accordingly, tracks 1, 4 and 7 (which falls outside the cell) are designated as power tracks for a power interconnect line 216. Note, the power track on track 4 includes a V1 via, but not a V0 via because the M0 segment below is a signal segment 212, rather than a power segment 210.

FIG. 4B shows that in Ver. 2 of the cell, the location of the first power track is moved by one M1 track inside the cell away from the origin with respect to Ver. 1 to track 2 and then there is power track located every third track. Accordingly, tracks 2 and 5 are designated as power tracks for a power interconnect line 216.

FIG. 4C shows that in Ver. 3 of the cell, the location of the first power track is moved by one M1 track inside the cell away from the origin with respect to Ver. 2 to track 3 and then there is power track located every third track. Accordingly, tracks 3 and 6 are designated as power tracks. In addition, a potential power track lies two tracks outside the cell boundary 204, and the designation of a power track wraps around to the first M1 track located outside the cell boundary 204 adjacent to the cell origin, as shown, thus maintaining the designation of one out of every three M1 tracks following the designation of track 6.

Figure 5:
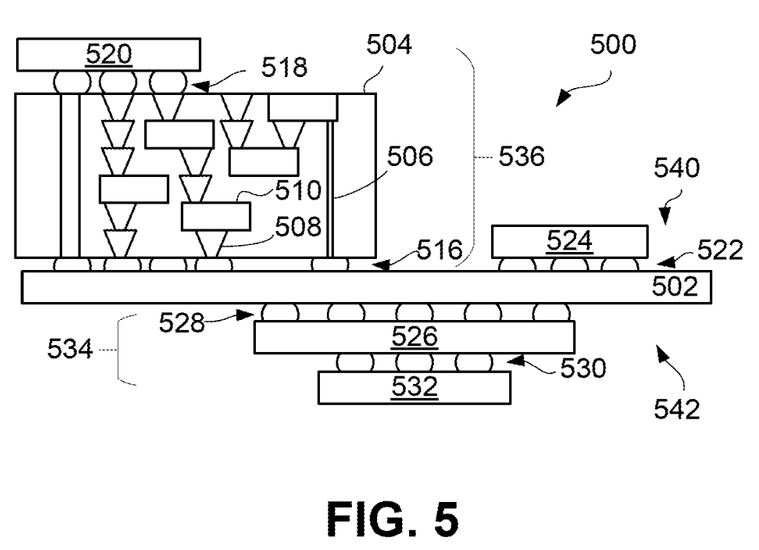
FIG. 5 is a cross-sectional side view of an integrated circuit (IC) device assembly that may include one or more cells with power shared tracks, in accordance with one or more of the embodiments disclosed herein.

FIG. 5 is a cross-sectional side view of an integrated circuit (IC) device assembly that may include one or more cells with power shared tracks, in accordance with one or more of the embodiments disclosed herein.

Referring to FIG. 5, an IC device assembly 500 includes components having one or more integrated circuit structures described herein. The IC device assembly 500 includes a number of components disposed on a circuit board 502 (which may be, e.g., a motherboard). The IC device assembly 500 includes components disposed on a first face 540 of the circuit board 502 and an opposing second face 542 of the circuit board 502. Generally, components may be disposed on one or both faces 540 and 542. In particular, any suitable ones of the components of the IC device assembly 500 may include a number of cells with a power shared tracks, such as disclosed herein.

In some embodiments, the circuit board 502 may be a printed circuit board (PCB) including multiple metal layers separated from one another by layers of dielectric material and interconnected by electrically conductive vias. Any one or more of the metal layers may be formed in a desired circuit pattern to route electrical signals (optionally in conjunction with other metal layers) between the components coupled to the circuit board 502. In other embodiments, the circuit board 502 may be a non-PCB substrate.

The IC device assembly 500 illustrated in FIG. 5 includes a package-on-interposer structure 536 coupled to the first face 540 of the circuit board 502 by coupling components 516. The coupling components 516 may electrically and mechanically couple the package-on-interposer structure 536 to the circuit board 502, and may include solder balls (as shown in FIG. 5), male and female portions of a socket, an adhesive, an underfill material, and/or any other suitable electrical and/or mechanical coupling structure.

The package-on-interposer structure 536 may include an IC package 520 coupled to an interposer 504 by coupling components 518. The coupling components 518 may take any suitable form for the application, such as the forms discussed above with reference to the coupling components 516. Although a single IC package 520 is shown, multiple IC packages may be coupled to the interposer 504. It is to be appreciated that additional interposers may be coupled to the interposer 504. The interposer 504 may provide an intervening substrate used to bridge the circuit board 502 and the IC package 520. The IC package 520 may be or include, for example, a die, or any other suitable component. Generally, the interposer 504 may spread a connection to a wider pitch or reroute a connection to a different connection. For example, the interposer 504 may couple the IC package 520 (e.g., a die) to a ball grid array (BGA) of the coupling components 516 for coupling to the circuit board 502. In the embodiment illustrated in FIG. 5, the IC package 520 and the circuit board 502 are attached to opposing sides of the interposer 504. In other embodiments, the IC package 520 and the circuit board 502 may be attached to a same side of the interposer 504. In some embodiments, three or more components may be interconnected by way of the interposer 504.

The interposer 504 may be formed of an epoxy resin, a fiberglass-reinforced epoxy resin, a ceramic material, or a polymer material such as polyimide. In some implementations, the interposer 504 may be formed of alternate rigid or flexible materials that may include the same materials described above for use in a semiconductor substrate, such as silicon, germanium, and other group III-V and group IV materials. The interposer 504 may include metal interconnects 510 and vias 508, including but not limited to through-silicon vias (TSVs) 506. The interposer 504 may further include embedded devices 514, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio-frequency (RF) devices, power amplifiers, power management devices, antennas, arrays, sensors, and microelectromechanical systems (MEMS) devices may also be formed on the interposer 504. The package-on-interposer structure 536 may take the form of any of the package-on-interposer structures known in the art.

The IC device assembly 500 may include an IC package 524 coupled to the first face 540 of the circuit board 502 by coupling components 522. The coupling components 522 may take the form of any of the embodiments discussed above with reference to the coupling components 516, and the IC package 524 may take the form of any of the embodiments discussed above with reference to the IC package 520.

The IC device assembly 500 illustrated in FIG. 5 includes a package-on-package structure 534 coupled to the second face 542 of the circuit board 502 by coupling components 528. The package-on-package structure 534 may include an IC package 526 and an IC package 532 coupled together by coupling components 530 such that the IC package 526 is disposed between the circuit board 502 and the IC package 532. The coupling components 528 and 530 may take the form of any of the embodiments of the coupling components 516 discussed above, and the IC packages 526 and 532 may take the form of any of the embodiments of the IC package 520 discussed above. The package-on-package structure 534 may be configured in accordance with any of the package-on-package structures known in the art.

Figure 6:
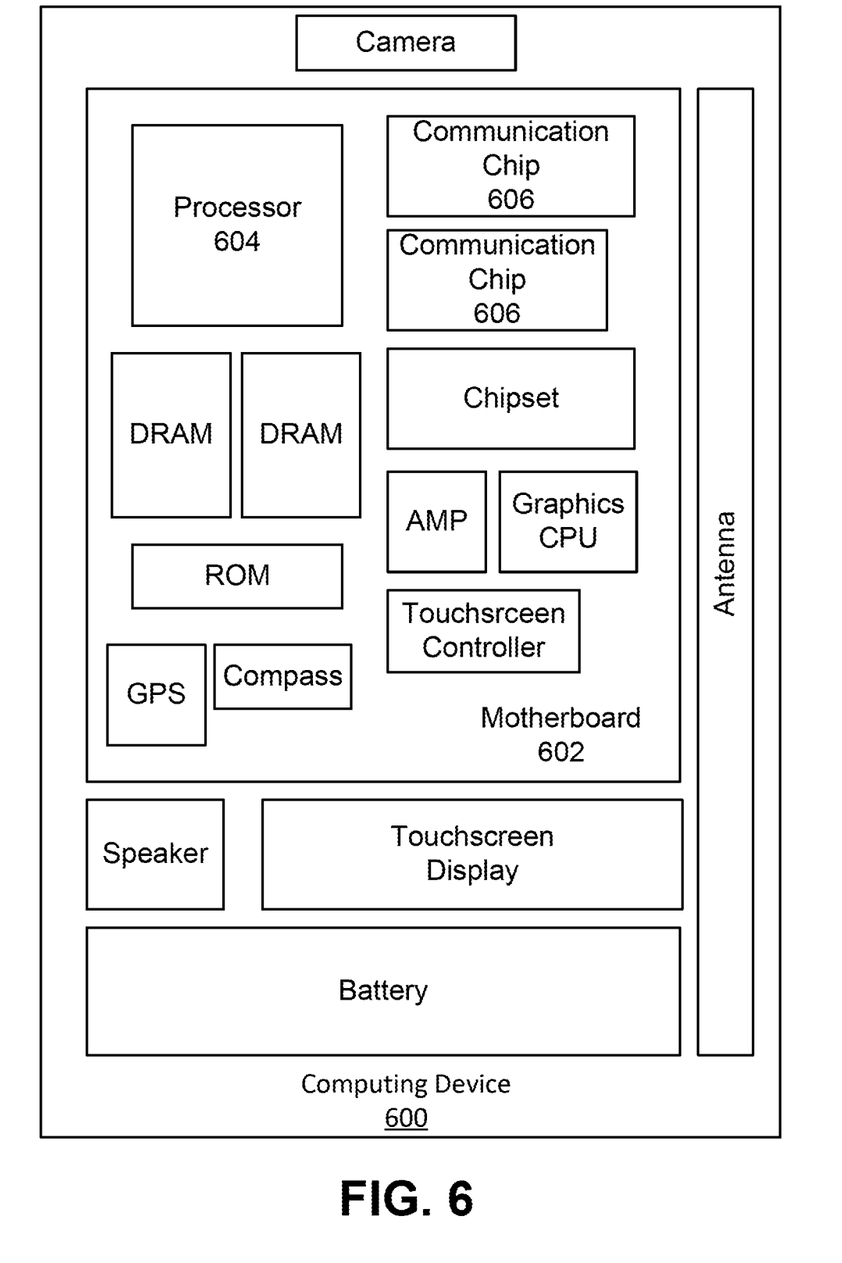
FIG. 6 illustrates a computing device in accordance with one implementation of the disclosure.

FIG. 6 illustrates a computing device 600 in accordance with one implementation of the disclosure. The computing device 600 houses a board 602. The board 602 may include a number of components, including but not limited to a processor 604 and at least one communication chip 606. The processor 604 is physically and electrically coupled to the board 602. In some implementations the at least one communication chip 606 is also physically and electrically coupled to the board 602. In further implementations, the communication chip 606 is part of the processor 604.

Depending on its applications, computing device 600 may include other components that may or may not be physically and electrically coupled to the board 602. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 606 enables wireless communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 606 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 600 may include a plurality of communication chips 606. For instance, a first communication chip 606 may be dedicated to shorter range wireless communications such as Wi-Fi and Bluetooth and a second communication chip 606 may be dedicated to longer range wireless communications such as GPS, EDGE, GPRS, CDMA, WiMAX, LTE, Ev-DO, and others.

The processor 604 of the computing device 600 includes an integrated circuit die packaged within the processor 604. In some implementations of the disclosure, the integrated circuit die of the processor includes one or more cells with power shared tracks, in accordance with implementations of embodiments of the disclosure. The term "processor" may refer to any device or portion of a device that processes electronic data from registers and/or memory to transform that electronic data into other electronic data that may be stored in registers and/or memory.

The communication chip 606 also includes an integrated circuit die packaged within the communication chip 606. In accordance with another implementation of embodiments of the disclosure, the integrated circuit die of the communication chip includes one or more cells with power shared tracks, in accordance with implementations of embodiments of the disclosure.

In further implementations, another component housed within the computing device 600 may contain an integrated circuit die that includes one or more cells with power shared tracks, in accordance with implementations of embodiments of the disclosure.

In various implementations, the computing device 600 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 600 may be any other electronic device that processes data.

Thus, embodiments described herein include power shared tracks. The above description of illustrated implementations of embodiments of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

These modifications may be made to the disclosure in light of the above detailed description. The terms used in the following claims should not be construed to limit the disclosure to the specific implementations disclosed in the specification and the claims. Rather, the scope of the disclosure is to be determined entirely by the following claims, which are to be construed in accordance with established doctrines of claim interpretation.

Example Embodiment 1

An integrated circuit structure includes a metal level comprising a plurality of interconnect lines along a first direction. A cell is on the metal level, wherein one or more of the plurality of interconnect lines that extend through the cell comprise a power shared track that is segmented inside the cell into one or more power segments and one or more signal segments so that both power and signals share a same track.

Example Embodiment 2

The integrated circuit structure of example embodiment 1, further comprising a first plurality of power interconnect lines on a second metal level, individual ones of the first plurality of power interconnect lines overlaying respective ones of the power segments and extending past a boundary of the cell. A first set of vias includes a respective via on individual ones of the first plurality of power interconnect lines to connect to the power segments on the first level.

Example Embodiment 3

The integrated circuit structure of embodiment 2, further comprising one or more power tracks on a third metal level along opposite boundaries of the cell. A second set of vias includes one or more vias on individual ones of the power tracks to connect to individual ones of the first plurality of power interconnect lines on the second metal level, such that the power segments on the first metal level are connected to the power tracks on the third metal level.

Example Embodiment 4

The integrated circuit structure of embodiment 3, further comprising a second plurality of power interconnect lines on the second metal level, individual ones of the second plurality of power interconnect lines overlaying respective ones of the signal segments and extending past the boundary of the cell, wherein the second plurality of power interconnect lines across the signal segments do not include vias.

Example Embodiment 5

An integrated circuit structure includes a first metal level comprising a plurality of interconnect lines along a first direction, and a cell on the first metal level, wherein one or more of the first plurality of interconnect lines that extend through the cell comprise a power shared track that is segmented inside the cell into one or more power segments and one or more signal segments so that both power and signals share a same track. A second metal level overlays the first metal level, the second metal level comprising a second plurality of interconnect lines along a second direction orthogonal to the first direction, individual ones of the second plurality of interconnect lines comprising power interconnect lines overlaying respective ones of the power segments and extending past a boundary of the cell. A first set of vias includes a respective via on individual ones of the power interconnect lines to connect to the power segments on the first level. A third metal level overlays the second metal level, the third metal level comprising a third plurality of interconnect lines along the first direction, wherein at least two of the third plurality of interconnect lines comprise power tracks along opposite boundaries of the cell; and a second set of vias that include one or more vias on individual ones of the power tracks to connect to individual ones of the first plurality of power interconnect lines on the second metal level, such that the power segments on the first metal level are connected to the power tracks on the third metal level.

Example Embodiment 6

The integrated circuit structure of embodiment 5, wherein the first metal level comprises a metal 0 level, the second metal level comprises a metal 1 level, and the third metal level comprises a metal 2 level.

Example Embodiment 7

The integrated circuit structure of embodiment 5 or 6, wherein the first plurality of interconnect lines on the first metal level further include a plurality of signal tracks between the power shared tracks.

Example Embodiment 8

The integrated circuit structure of embodiment 5, 6, or 7, wherein locations of the power interconnect lines in the cell is are stored in respective multiple cell versions in a cell library.

Example Embodiment 9

The integrated circuit structure of embodiment 5, 6, 7, or 8, wherein the locations of the power interconnect lines on the second metal level are varied across the multiple cell versions to avoid block level abutment between the power interconnect lines of adjacently placed ones of the cells.

Example Embodiment 10

The integrated circuit structure of claim 5, 6, 7, 8, or 9, wherein the first metal level includes a first plurality of interconnect lines along a first direction, the second metal level includes a second plurality of interconnect lines along a second direction orthogonal to the first direction, and the third metal level includes a third plurality of interconnect lines along the first direction.

Example Embodiment 11

A cell library stored on a tangible medium, the cell library comprising a plurality of entries that define multiple types of power shared cells available for use in physical implementations, wherein a power shared cell has a power shared track on a first metal level that is segmented inside the cell into one or more power segments and one or more signal segments. Multiple versions are provided for individual ones of the power shared cells, wherein the multiple versions vary a location of power interconnect lines on a second metal level so that during cell placement, the multiple cell versions may be selected and placed in a manner that avoids block level abutment between interconnect lines of adjacently placed cells.

Example Embodiment 12

The cell library of embodiment 11, wherein the multiple versions include second metal level configuration layouts.

Example Embodiment 13

The cell library of embodiment 11, 12, or 13, wherein the multiple versions are designed with a predefined number of tracks on the first metal level to complete internal routing of the cell.

Example Embodiment 14

The cell library of embodiment 11, 12, or 13, wherein the first metal level includes a first plurality of interconnect lines along a first direction, and the second metal level includes a second plurality of interconnect lines along a second direction orthogonal to the first direction.

Example Embodiment 15

The cell library of embodiment 11, 12, 13, or 14, wherein across the multiple versions of individual ones of the power shared cells, a location of the power track on the first metal level is varied in a step-wise movement of x tracks in relation to an adjacent version of the corresponding cell.

Example Embodiment 16

The cell library of embodiment 15, wherein the step-wise movement of the power track location wraps around to a track on an outside of an opposite side of the cell adjacent to an origin of the power shared cells in at least one of the versions of a corresponding power shared cell.

Example Embodiment 17

A method of fabricating a layout for an integrated circuit structure includes designing multiple types of power shared cells to be included in a standard cell library, wherein the power shared cells have a power shared track on a first metal level that is segmented inside the cell into one or more power segments and one or more signal segments so that both power and signals share a same track. A plurality of different versions are designed for individual ones of the power shared track cells so that individual versions of a particular power shared cell vary a location of the power interconnect lines on a second metal level that extend past a cell boundary so that during cell placement, the multiple cell versions may be selected and placed in a manner that avoids block level abutment between interconnect lines of adjacently placed cells. The cell library is accessed during placement and routing functions and selecting and placing physical implementations of the different versions of the cells in a manner that avoids block level abutment between the power interconnect lines of adjacently placed cells. Block level routing is performed on the physical implementations of the cells.

Example Embodiment 18

The method of embodiment 17, further comprising designing the cell library to include a plurality of entries that define respective ones of the multiple types of power shared cells available for use in physical implementations.

Example Embodiment 19

The method of embodiment 17 or 18, further comprising designing the plurality of entries to include a second metal level configuration layouts corresponding to the plurality of different versions of the corresponding cell.

Example Embodiment 20

The method of embodiment 17, 18, or 19, further comprising designing the plurality of different versions to require a predefined number of tracks on the first metal level to complete internal routing of the cell.

Example Embodiment 21

The method of embodiment 17, 18, 19, or 20, further comprising designing the plurality of different versions to require one out of every n of the predefined number of tracks on the first metal level to be designated for use as a power track on the first metal level on which one or more one power interconnect line is laid.

Example Embodiment 22

The method of embodiment 19, 20, or 21, further comprising designing the plurality of different versions so that across the plurality of different versions of individual ones of the power shared cells, the location of the power track on the first metal level is varied in a step-wise movement of x tracks in relation to an adjacent version of the corresponding cell.

Example Embodiment 23

The method of embodiment 22, further comprising designing the step-wise movement so that the location of the power track wraps around to a track on an outside of an opposite side of the corresponding power shared in at least one of the versions.

Example Embodiment 24

The method of embodiment 23, further comprising designing the power shared cells such that n=3 and x=1.

Example Embodiment 25

The method of embodiment 17, 18, 19, 20, 21, 22, 23, or 24, further comprising designing the power shared cells such that first metal level comprises a metal 0 level and the second metal level comprises a metal 1 level.

What is claimed is:
1. An integrated circuit structure, comprising:
a metal level comprising a plurality of interconnect lines along a first direction;

a cell on the metal level, wherein one or more of the plurality of interconnect lines that extend through the cell comprise a power shared track that is segmented inside the cell into one or more power segments and one or more signal segments so that both power and signals share a same track.

2. The integrated circuit structure of claim 1, further comprising:
a first plurality of power interconnect lines on a second metal level, individual ones of the first plurality of power interconnect lines overlaying respective ones of the power segments and extending past a boundary of the cell; and
a first set of vias that include a respective via on individual ones of the first plurality of power interconnect lines to connect to the power segments on the first level.

3. The integrated circuit structure of claim 2, further comprising:
a pair of power tracks on a third metal level along opposite boundaries of the cell; and
a second set of vias that include one or more vias on individual ones of the power tracks to connect to individual ones of the first plurality of power interconnect lines on the second metal level, such that the power segments on the first metal level are connected to the power tracks on the third metal level.

4. The integrated circuit structure of claim 3, further comprising:
a second plurality of power interconnect lines on the second metal level, individual ones of the second plurality of power interconnect lines overlaying respective ones of the signal segments and extending past the boundary of the cell, wherein the second plurality of power interconnect lines across the signal segments do not include vias.

5. An integrated circuit structure, comprising:
a first metal level comprising:
a first plurality of interconnect lines along a first direction;
a cell on the first metal level, wherein one or more of the first plurality of interconnect lines that extend through the cell comprise a power shared track that is segmented inside the cell into one or more power segments and one or more signal segments so that both power and signals share a same track;
a second metal level overlaying the first metal level, the second metal level comprising:
a second plurality of interconnect lines along a second direction orthogonal to the first direction, individual ones of the second plurality of interconnect lines comprising power interconnect lines overlaying respective ones of the power segments and extending past a boundary of the cell; and
a first set of vias that include a respective via on individual ones of the power interconnect lines to connect to the power segments on the first level; and
a third metal level overlaying the second metal level, the third metal level comprising:
a third plurality of interconnect lines along the first direction, wherein third plurality of interconnect lines comprise power tracks along opposite boundaries of the cell; and
two of the third plurality of interconnect lines comprise power tracks along opposite boundaries of the cell; and
a second set of vias that include one or more vias on individual ones of the power tracks to connect to individual ones of the second plurality of power interconnect lines on the second metal level, such that the power segments on the first metal level are connected to the power tracks on the third metal level.

6. The integrated circuit structure of claim 5, wherein the first metal level comprises a metal 0 level, the second metal level comprises a metal 1 level, and the third metal level comprises a metal 2 level.

7. The integrated circuit structure of claim 5, wherein the first plurality of interconnect lines on the first metal level further include a plurality of signal tracks between the power shared tracks.

8. The integrated circuit structure of claim 7, wherein locations of the power interconnect lines in the cell is are stored in respective multiple cell versions in a cell library.

9. The integrated circuit structure of claim 8, wherein the locations of the power interconnect lines on the second metal level are varied across the multiple cell versions to avoid block level abutment between the power interconnect lines of adjacently placed ones of the cells.

10. The integrated circuit structure of claim 5, wherein the first metal level includes a first plurality of interconnect lines along a first direction, the second metal level includes a second plurality of interconnect lines along a second direction orthogonal to the first direction, and the third metal level includes a third plurality of interconnect lines along the first direction.

11. A cell library stored on a tangible medium, the cell library comprising:
a plurality of entries that define multiple types of power shared cells available for use in physical implementations, wherein a power shared cell has a power shared track on a first metal level that is segmented inside the cell into one or more power segments and one or more signal segments; and
multiple versions for individual ones of the power shared cells, wherein the multiple versions vary a location of power interconnect lines on a second metal level so that during cell placement, the multiple cell versions may be selected and placed in a manner that avoids block level abutment between interconnect lines of adjacently placed cells.

12. The cell library of claim 11, wherein the multiple versions include second metal level configuration layouts.

13. The cell library of claim 11, wherein the multiple versions are designed with a predefined number of tracks on the first metal level to complete internal routing of the cell.

14. The cell library of claim 13, wherein at a block level one out of every n of the predefined number of tracks on the first metal level are designated for use as a power track on the first metal level on which one or more one power interconnect line is laid.

15. The cell library of claim 14, wherein across the multiple versions of individual ones of the power shared cells, a location of the power track on the first metal level is varied in a step-wise movement of x tracks in relation to an adjacent version of the corresponding cell.

16. The cell library of claim 15, wherein the step-wise movement of the power track location wraps around to a track on an outside of an opposite side of the cell adjacent to an origin of the power shared cells in at least one of the versions of a corresponding power shared cell.

17. A method of fabricating a layout for an integrated circuit structure, the method comprising:
designing multiple types of power shared cells to be included in a standard cell library, wherein the power shared cells have a power shared track on a first metal level that is segmented inside the cell into one or more power segments and one or more signal segments so that both power and signals share a same track;

designing a plurality of different versions for individual ones of the power shared cells so that individual versions of a particular power shared cell vary a location of the power interconnect lines on a second metal level that extend past a cell boundary so that during cell placement, the multiple cell versions may be selected and placed in a manner that avoids block level abutment between interconnect lines of adjacently placed cells;

accessing the cell library during placement and routing functions and selecting and placing physical implementations of the different versions of the cells in a manner that avoids block level abutment between the power interconnect lines of adjacently placed cells; and performing block level routing on the physical implementations of the cells.

18. The method of claim 17, further comprising designing the cell library to include a plurality of entries that define respective ones of the multiple types of power shared cells available for use in physical implementations.

19. The method of claim 18, further comprising designing the plurality of entries to include a second metal level configuration layouts corresponding to the plurality of different versions of the corresponding cell.

20. The method of claim 17, further comprising designing the plurality of different versions to require a predefined number of tracks on the first metal level to complete internal routing of the cell.

21. The method of claim 20, further comprising designing the plurality of different versions to require one out of every n of the predefined number of tracks on the first metal level to be designated for use as a power track on the first metal level on which one or more one power interconnect line is laid.

22. The method of claim 21, further comprising designing the plurality of different versions so that across the plurality of different versions of individual ones of the power shared cells, the location of the power track on the first metal level is varied in a step-wise movement of x tracks in relation to an adjacent version of the corresponding cell.

23. The method of claim 22, further comprising designing the step-wise movement so that the location of the power track wraps around to a track on an outside of an opposite side of the corresponding power shared in at least one of the versions.

24. The method of claim 22, further comprising designing the power shared cells such that n=3 and x=1.

25. The method of claim 17, further comprising designing the power shared cells such that first metal level comprises a metal 0 level and the second metal level comprises a metal 1 level.

* * * * *